(12) United States Patent
Yao

(10) Patent No.: US 9,860,370 B2
(45) Date of Patent: Jan. 2, 2018

(54) OPERATING ENVIRONMENT SETTING SYSTEM, PORTABLE TERMINA, REPAY DEVICE AND OPERATING ENVIRONMENT SETTING PROGRAM

(71) Applicant: E3 Co., Ltd., Tokyo (JP)

(72) Inventor: Bingwei Yao, Tokyo (JP)

(73) Assignee: E3 CO., LTD., Tokyo (JP)

(*) Notice: Subject to any disclaimer, the term of this patent is extended or adjusted under 35 U.S.C. 154(b) by 37 days.

(21) Appl. No.: 14/911,151

(22) PCT Filed: May 15, 2015

(86) PCT No.: PCT/JP2015/064056
§ 371 (c)(1),
(2) Date: Feb. 9, 2016

(87) PCT Pub. No.: WO2016/185519
PCT Pub. Date: Nov. 24, 2016

(65) Prior Publication Data
US 2017/0155758 A1    Jun. 1, 2017

(51) Int. Cl.
*H04M 3/42* (2006.01)
*H04W 4/00* (2009.01)
(Continued)

(52) U.S. Cl.
CPC ............ *H04M 3/42* (2013.01); *G06K 7/1434* (2013.01); *H04L 65/1006* (2013.01);
(Continued)

(58) Field of Classification Search
CPC ...... H04M 3/42; H04M 1/725; G06K 7/1434; H04L 65/1073; H04L 65/1006;
(Continued)

(56) References Cited

U.S. PATENT DOCUMENTS

2011/0081860 A1* 4/2011 Brown ............... H04N 1/00347
455/41.3
2014/0362839 A1* 12/2014 Fukuda ............. H04M 1/72502
370/338

FOREIGN PATENT DOCUMENTS

| JP | 2010-021661 A | 1/2010 |
| JP | 2014-003363 A | 1/2014 |
| JP | 2014-179884 A | 9/2014 |

OTHER PUBLICATIONS

Supplementary European Search Report dated Aug. 22, 2017 issued in the corresponding European Application No. 15832787.4, pp. 1-11.

* cited by examiner

*Primary Examiner* — Lester Kincaid
*Assistant Examiner* — William Wang
(74) *Attorney, Agent, or Firm* — Polsinelli PC

(57) ABSTRACT

There are provided a code reading unit for reading a code in a portable terminal, a first terminal side operating environment setting unit for analyzing a code, thereby acquiring first operating environment setting information required for connection to a relay device through Bluetooth and setting the first operating environment setting information to the portable terminal, a setting information generating unit 4 for generating second operating environment setting information required for connection to a telephone call control server through a wireless LAN to make a call, a second terminal side operating environment setting unit for setting the second operating environment setting information thus generated to the portable terminal, and transmitting the second operating environment setting information to the telephone call control server and registering the second operating environment setting information therein.

17 Claims, 9 Drawing Sheets

(51) Int. Cl.
  *H04M 1/725* (2006.01)
  *H04W 76/02* (2009.01)
  *H04L 29/08* (2006.01)
  *H04L 29/06* (2006.01)
  *G06K 7/14* (2006.01)
  *H04W 84/12* (2009.01)
  *H04W 88/04* (2009.01)

(52) U.S. Cl.
  CPC .......... *H04L 65/1073* (2013.01); *H04L 67/34* (2013.01); *H04M 1/725* (2013.01); *H04W 4/008* (2013.01); *H04W 76/021* (2013.01); *H04W 76/023* (2013.01); *H04W 84/12* (2013.01); *H04W 88/04* (2013.01)

(58) Field of Classification Search
  CPC ...... H04L 67/34; H04W 88/04; H04W 84/12; H04W 76/023; H04W 76/021; H04W 4/008
  See application file for complete search history.

US 9,860,370 B2

OPERATING ENVIRONMENT SETTING SYSTEM, PORTABLE TERMINA, REPAY DEVICE AND OPERATING ENVIRONMENT SETTING PROGRAM

CROSS REFERENCE TO RELATED APPLICATIONS

This application is a National Phase filing under 35 U.S.C. §371 of PCT/JP2015/064056 filed on May 15, 2015, the entire contents of which are hereby incorporated by reference.

TECHNICAL FIELD

The present invention relates to an operating environment setting system, an operating environment setting device and an operating environment setting program, and more particularly, is suitably used for a system for setting an operating environment of a cordless telephone system which can utilize a portable terminal such as a smartphone as a cordless extension unit of a cordless telephone.

BACKGROUND ART

Conventionally, there is known the technique for utilizing a smartphone as a cordless extension unit of a fixed telephone (for example, see Patent Document 1). The Patent Document 1 discloses the technique related to an SIP (Session Initiation Protocol) client application. The SIP client application is operated on the smartphone, and the smartphone is extension accommodated as an SIP terminal in an SIP control unit incorporated in a network termination device such as a home gateway and an outgoing call, an incoming call, a telephone call or the like can be performed by the smartphone.

A smartphone in which the SIP client application is operated is registered as a cordless extension unit of a house telephone in the SIP control unit. The SIP control unit transmits an incoming call signal to the SIP client application on the smartphone when a call arrives. The SIP client application receiving the incoming call signal presents the incoming call to a user, and the user starts a telephone call. In order to use the smartphone as the cordless extension unit, thus, it is necessary to install the SIP client application into the smartphone, thereby performing various setting required for the SIP control unit.

Patent Document 1: Japanese Laid-open Patent Publication No. 2014-3363

DISCLOSURE OF THE INVENTION

In the related art, however, it is necessary for a user to manually carry out various setting for an SIP control unit. For this reason, there is a problem in that the user should perform a work for the setting, which is troublesome. Moreover, there is also a problem in that a user having no sufficient knowledge about setting of SIP is hard to perform the setting.

The present invention has been made to solve the problems and has an object to enable automatic execution or necessary setting for utilizing a portable terminal such as a smartphone as a cordless extension unit of a cordless telephone.

In order to attain the object, in the present invention, a code recording first operating environment setting information required for connecting a portable terminal and a relay device by wireless under a first wireless standard is read and analyzed in the portable terminal, and the first operating environment setting information is set to the portable terminal and the relay device. Moreover, second operating environment setting information required for connection of the portable terminal and the relay device to a telephone call control server under a second wireless standard is generated in the portable terminal and the second operating environment setting information thus generated is sat to the portable terminal, and the second operating environment setting information is transmitted to the telephone call control server and is registered therein. By utilizing the wireless connection set as described above, furthermore, the second operating environment setting information thus generated is transmitted from the portable terminal to the relay device and the second operating environment setting information is set to the relay device, and the second operating environment setting information is transmitted to the telephone call control server and is registered therein.

According to the present invention having the structure described above, if the code is read by the portable terminal including a code reader, the wireless connection under the first wireless standard is automatically set between the portable terminal and the relay device by reading the code. By utilizing the set wireless connection, furthermore, setting required for connection of the portable terminal and the relay device to the telephone call control server under the second wireless standard is continuously performed automatically. Consequently, it is possible to automatically perform setting required for utilizing the portable terminal as a cordless extension unit of a cordless telephone through the relay device and the telephone call control server.

BEST MODE FOR CARRYING OUT THE INVENTION

First Embodiment

Figure 1:
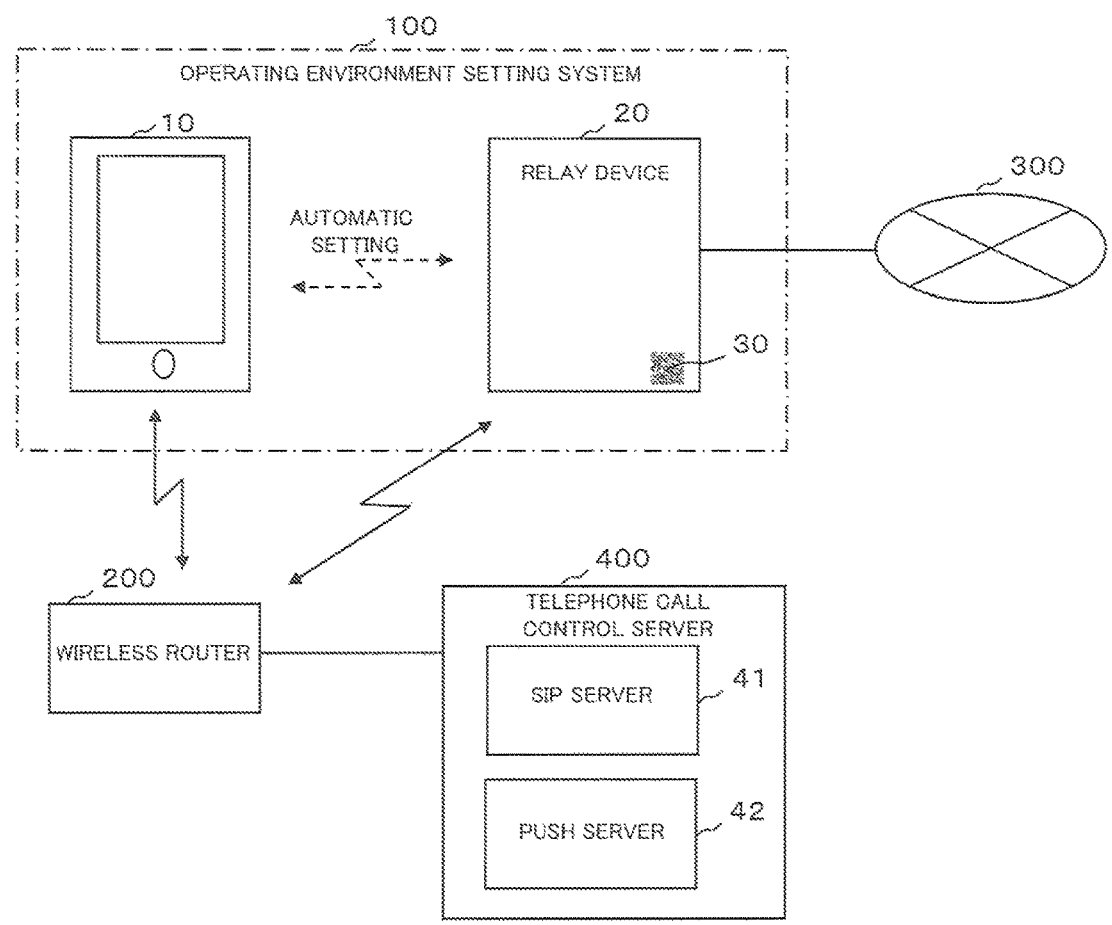
FIG. 1 is a diagram showing a schematic structure of a cordless telephone system including an operating environment setting system according to a first embodiment.

A first embodiment according to the present invention will be described below with reference to the drawings. FIG. 1 is a diagram showing a schematic structure of a cordless telephone system including an operating environment setting system according to the first embodiment.

As shown in FIG. 1, an operating environment setting system 100 according to the first embodiment includes a portable terminal 10 and a relay device 20 and can automatically set an operating environment of a cordless telephone system by reading a code 30. The operating environment to be set in the first embodiment relates to Bluetooth connection between the portable terminal 10 and the relay device 20 and SIP registration information to be registered in an SIP server 41.

Referring to the cordless telephone system to be a target for setting the operating environment according to the first embodiment, the portable terminal 10 having a telephone call application installed therein can be used as a cordless extension unit of a cordless telephone by connection of the portable terminal 10 to a fixed telephone line 300 through the relay device 20 and a telephone call control server 400.

The portable terminal 10 is a smartphone or a tablet, for example, and has a wireless communication function through Bluetooth and a wireless communication function through a wireless LAN such as Wi-Fi. Moreover, the portable terminal 10 has a camera and can read the code 30.

In the first embodiment, it is assumed that necessary information for performing wireless communication by the wireless LAN through a wireless router 200 has already been set to the portable terminal 10. In other words, necessary connection setting information (SSID, a cipher mode, a password or the like) for connection through the wireless LAN has already been registered as a profile of the wireless router 200 in the portable terminal 10. This connection setting of the wireless LAN can be performed manually by a user.

The relay device 20 has a wireless communication function through Bluetooth and a wireless communication function through a wireless LAN such as Wi-Fi. However, the relay device 20 includes neither a camera nor a code reader. It is assumed that necessary information for performing wireless communication by the wireless LAN through the wireless router 200 is also set to the relay device 20. The relay device 20 is connected to the fixed telephone line 300.

The code 30 is stuck or printed on the relay device 20. Although the code 30 is a bar code or a two-dimensional code as an example, it is not restricted thereto. In other words if the code 30 can be input/output as digital information which is obtained by conversion in accordance with a fixed rule and can easily be read by a camera or a reading device such as a code reader, it may take a configuration other than the bar code or the two-dimensional code.

In the present embodiment information (first operating environment setting information) required for setting to perform wireless connection between the portable terminal 10 and the relay device 20 through Bluetooth (a first wireless standard) is recorded on the code 30. Herein, the first operating environment setting information includes a name and a serial number of the relay device 20 and the like. The portable terminal 10 acquires these information to carry out setting so that connection setting (pairing) through the Bluetooth is performed together with the relay device 20.

The telephone call control server 400 serves to manage and control an IP telephone utilizing SIP and includes the SIP server 41 and a PUSH server 42. The SIP server 41 mediates call origination information between the fixed telephone line 300 and the portable terminal 10. The PUSH server 42 transmits a request message for a callback to the portable terminal 10 in response to a message transmission request given from the SIP server 41.

When a caller makes a phone call via the fixed telephone line 300, specifically, an incoming call notification signal is sent from the fixed telephone line 300 to the SIP server 41 through the relay device 20 and the wireless router 200. The SIP server 41 receiving the incoming call notification signal once brings an incoming call line into a holding state and supplies a message transmission request to the PUSH server 42.

Upon receipt of the message transmission request from the SIP server 41, the PUSH server 42 accesses the portable terminal 10 and transmits a callback request signal. The SIP server 41 is connected to the held incoming call line upon receipt of a callback to be performed by the portable terminal 10 in response to the callback request signal. Consequently, the portable terminal 10 is connected to the fixed telephone line 300 to set a call enabling state.

In the first embodiment, there is automatically set information (second operating environment setting information) required for setting to connect the portable terminal 10 and the relay device 20 to the SIP server 41 by wireless through the wireless LAN (a second wireless standard) and to then make a call. The second operating environment setting information to be set herein is a password to be used in the connection of the portable terminal 10 and the relay device 20 to the SIP server 41.

In other words, in the first embodiment, the Bluetooth connection setting (pairing) using the first operating environment setting information is performed between the portable terminal 10 and the relay device 20 as described above and the second operating environment setting information is then registered automatically in the portable terminal 10, the relay device 20 and the SIP server 41 through data exchange utilizing the Bluetooth.

Figure 2:
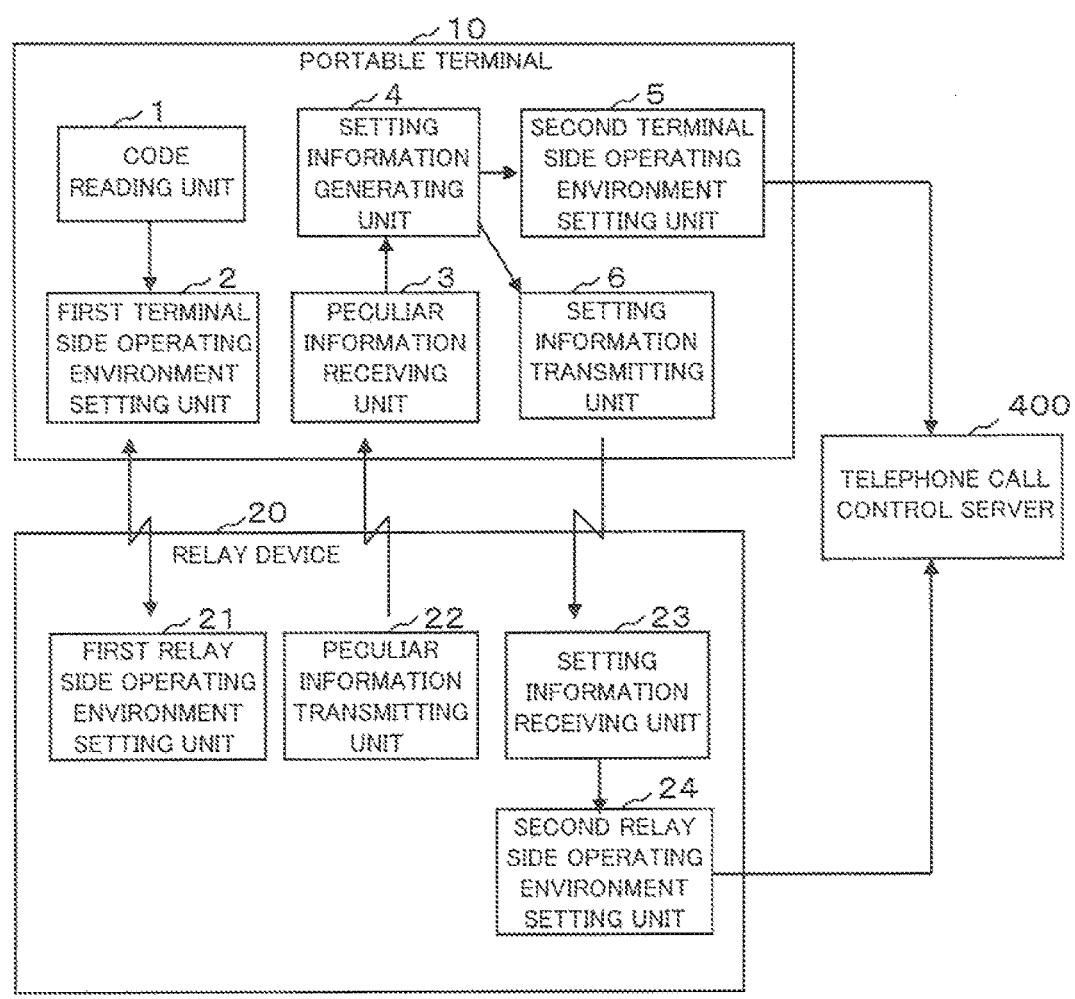
FIG. 2 is a block diagram showing an example of functional structures of a portable terminal and a relay device which configure the operating environment setting system according to the first embodiment.

FIG. 2 is a block diagram showing an example of functional structures of the portable terminal 10 and the relay device 20 configuring the operating environment setting system 100 according to the first embodiment. FIG. 2 illustrates only a main functional structure related to setting of the operating environment of the cordless telephone system.

As shown in FIG. 2, the portable terminal 10 includes, as a functional structure thereof, a code reading unit 1, a first terminal side operating environment setting unit 2, a peculiar information receiving unit 3, a setting information generating unit 4, a second terminal side operating environment setting unit 5 and a setting information transmitting unit 6. Moreover, the relay device 20 includes, as a functional structure thereof, a first relay side operating environment setting unit 21, a peculiar information transmitting unit 22, a setting information receiving unit 23 and a second relay side operating environment setting unit 24.

Each of function blocks 1 to 6 of the portable terminal 10 is configured from a telephone call application installed in the portable terminal 10, for example. In this case, the respective function blocks 1 to 6 actually include a CPU, an RAM, an ROM and the like in a computer and are implemented by an operation of a program of the telephone call application stored in a recording medium such as the RAM, the ROM, a hard disk or a semiconductor memory. A part or whole of one function blocks 1 to 6 can also be configured from hardware or a DSP (Digital Signal Processor).

Moreover, each of the function blocks 21 to 24 of the relay device 20 can also be configured from all of the hardware, the DSP and software. For example, in the case in which each of the function blocks 21 to 24 is configured from the software, it actually includes the CPU, the RAM, the ROM and the like in the computer and is implemented by an operation of a program stored in a recording medium such as the RAM, the ROM, the hard disk or the semiconductor memory.

The code reading unit 1 of the portable terminal 10 corresponds to a reading unit according to claims and serves to read the code 30 (an example of a medium) stuck or printed on the relay device 20 through a camera (not shown) provided in the portable terminal 10.

The first terminal side operating environment setting unit 2 of the portable terminal 10 analyzes the code 30 read by the code reading unit 1, and acquires the first operating environment setting information (information including the name and serial number of the relay device 20 and the like) required for setting the wireless connection (pairing) through the Bluetooth and sets the first operating environment setting information to the portable terminal 10.

Moreover, the first terminal side operating environment setting unit 2 transmits, to the relay device 20, information (the information including the name and serial number of the portable terminal 10 and the like) required for the relay device 20 to set the wireless connection (pairing) through the Bluetooth together with the portable terminal 10. Thus, the necessary information for both the portable terminal 10 and the relay device 20 is set so that the pairing through the Bluetooth is performed. The portable terminal 10 and the relay device 20 once subjected to the pairing are connected automatically from the next time.

When the wireless connection through the Bluetooth is to be set by the first terminal side operating environment setting unit 2 of the portable terminal 10, the first relay side operating environment setting unit 21 of the relay device 20 acquires the information (the information including the name and serial number of the portable terminal 10 and the like) required for setting the wireless connection from the portable terminal 10 and sets the information to the relay device 20. Consequently, the pairing through the Bluetooth is performed between the portable terminal 10 and the relay device 20.

The peculiar information transmitting unit 22 of the relay device 20 transmits peculiar identification information to the relay device 20 (for example, the serial number or an MAC address of the relay device 20 or the like) to the portable terminal 10 by utilizing the wireless connection through the Bluetooth set by the first terminal side operating environment setting unit 2 and the first relay side operating environment setting unit 21.

The peculiar information receiving unit 3 of the portable terminal 10 receives the identification information of the relay device 20 transmitted from the relay device 20 by utilizing the wireless connection through the Bluetooth set by the first terminal side operating environment setting unit 2 and the first relay side operating environment setting unit 21.

The setting information generating unit 4 of the portable terminal 10 encrypts the identification information of the relay device 20 received by the peculiar information receiving unit 3 to generate the second operating environment setting information required for connecting the portable terminal 10 and the relay device 20 to the SIP server 41 by wireless through the wireless router 200 via the Wi-Fi (the second wireless standard) and then making a call. The second operation environment setting information generated herein is a password to be used in access to the SIP server 41. The setting information generating unit 4 supplies the generated second operating environment setting information (the password) to the second terminal side operating environment setting unit 5 and the setting information transmitting unit 6.

The second terminal side operating environment setting unit 5 of the portable terminal 10 sets the second operating environment setting information (the password) generated by the setting information generating unit 4 to the portable terminal 10, and furthermore, transmits the second operating environment setting information to the telephone call control server 400 and registers the second operating environment setting information therein. At this time, the second terminal side operating environment setting unit 5 generates a registration ID of the portable terminal 10, and furthermore, acquires an IP address of the portable terminal 10. Then, the second terminal side operating environment setting unit 5 sets the registration ID of the portable terminal 10 and a password to the portable terminal 10, and furthermore, registers the registration ID and the IP address of the portable terminal 10 and the password in the telephone call control server 400.

The registration ID and the password set to the portable terminal 10 are used when the portable terminal 10 makes a callback to the SIP server 41 in response to a callback request signal transmitted from the PUSH server 42. The IP address of the portable terminal 10 registered in the telephone call control server 400 is used when the PUSH server 42 transmits a callback request signal to the portable terminal 10. Moreover, the registration ID of the portable terminal 10 and the password registered in the telephone call control server 400 are used for authentication processing to foe executed when the callback is made from the portable terminal 10 to the SIP server 41.

The setting information transmitting unit 6 of the portable terminal 10 transmits the second operating environment setting information (the password) generated by the setting information generating unit 4 to the relay device 20 by utilizing the wireless connection through the Bluetooth set by the first terminal side operating environment setting unit 2. The setting information receiving unit 23 of the relay device 20 receives the second operating environment setting information transmitted by the setting information transmitting unit 6.

The second relay side operating environment setting unit 24 of the relay device 20 sets the second operating environment setting information received by the setting information receiving unit 23 to the relay device 20, and furthermore, transmits the second operating environment setting information to the telephone call control server 400 and registers the second operating environment setting information therein. At this time, the second relay side operating environment setting unit 24 generates a registration ID of the relay device 20, and furthermore, acquires an IP address of the relay device 20. Then, the second relay side operating environment setting unit 24 sets the registration ID of the relay device 20 and a password to the relay device 20, and furthermore, registers the registration ID and the IP address of the relay device 20 and the password to the telephone call control server 400.

The registration ID and the password set to the relay device 20 are used when the relay device 20 accesses the SIP server 41. The IP address of the relay device 20 registered in the telephone call control server 400 is used when the SIP server 41 accesses the relay device 20. Moreover, the registration ID of the relay device 20 and the password registered in the telephone call control server 400 are used for authentication processing to be executed when access is gained from the relay device 20 to the SIP server 41.

The telephone call control server 400 registers a parent-child relationship based on the registration ID or the IP address to be registered from each of the portable terminal 10 and the relay device 20. In other words, the relay device 20 is registered as a base unit of a cordless telephone and the portable terminal 10 is registered as a cordless extension unit of the cordless telephone.

Figure 3:
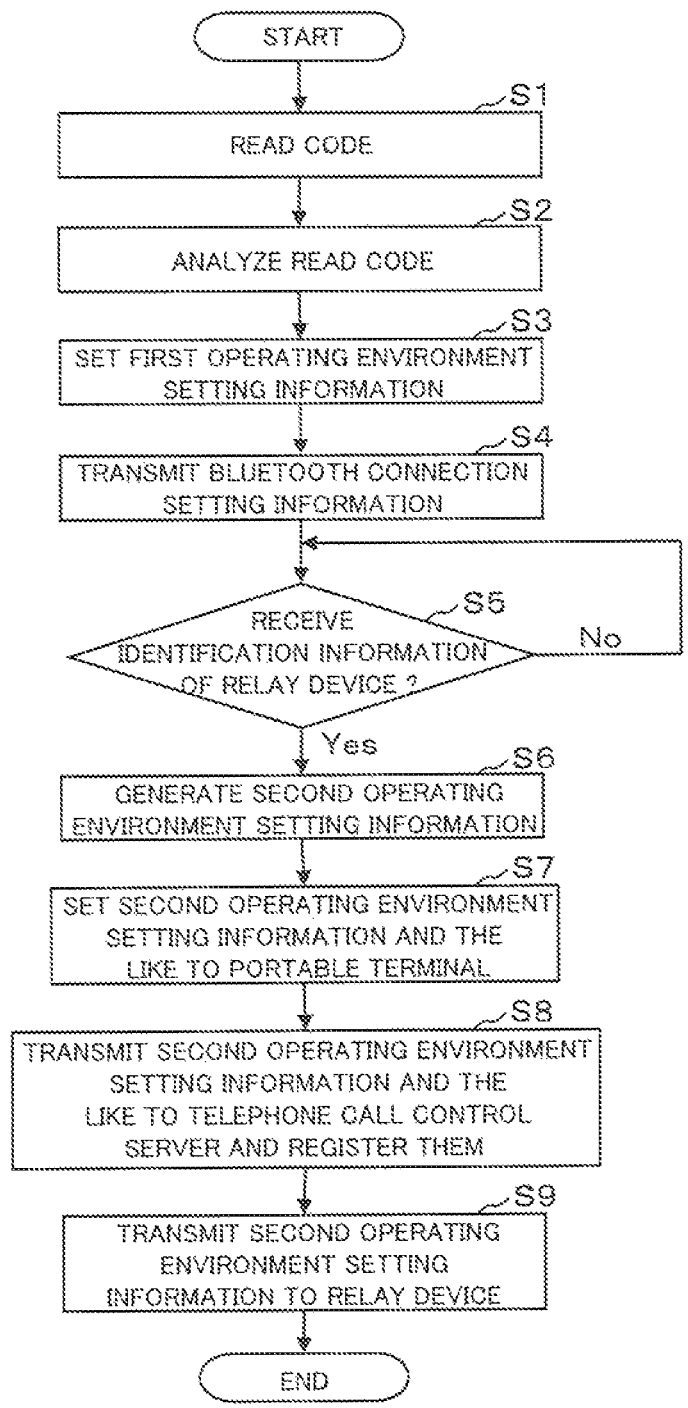
FIG. 3 is a flowchart showing an example of an operation of the portable terminal according to the first embodiment.
Figure 4:
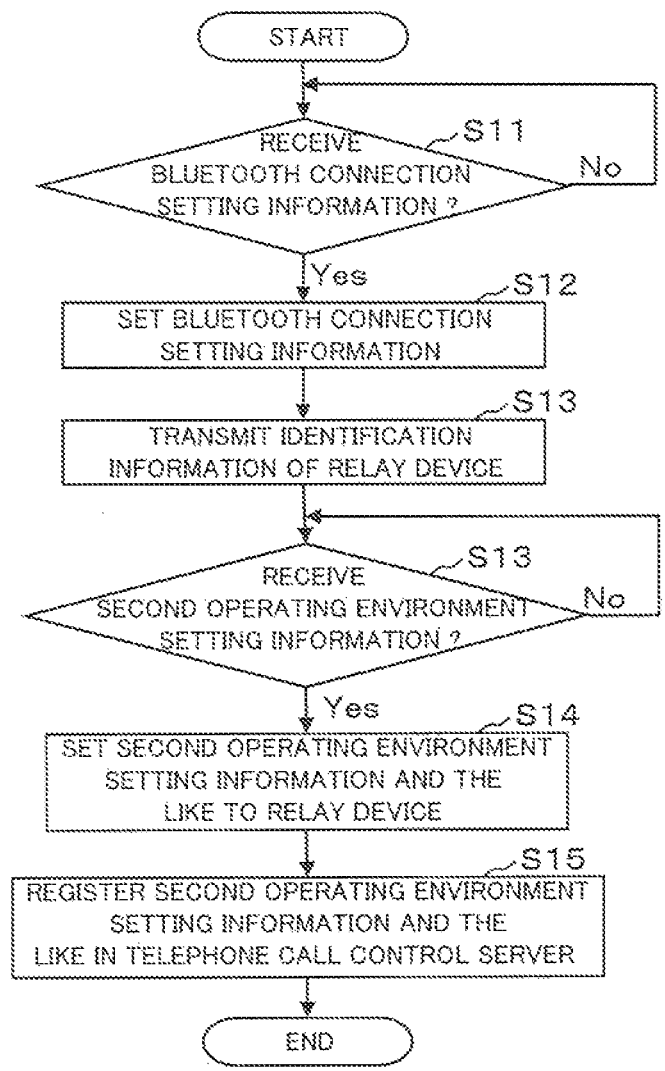
FIG. 4 is a flowchart showing an example of an operation of the relay device according to the first embodiment.

FIG. 3 is a flowchart showing an example of an operation of the portable terminal 10 according to the first embodiment having the structure described above. Moreover, FIG. 4 is a flowchart showing an example of an operation of the relay device 20 according to the first embodiment having the structure described above. Flowcharts shown in FIGS. 3 and 4 are started when power supplies of the portable terminal 10 and the relay device 20 are turned ON and the Bluetooth function of the portable terminal 10 is activated, for example.

In FIG. 3, in the portable terminal 10, the code reading unit 1 first reads the code 30 stuck or printed on the relay device 20 (Step S1). Next, the first terminal side operating environment setting unit 2 analyses the code 30 read by the code reading unit 1 (Step S2) and the first operating environment setting information (the information including the name and serial number of the relay device 20 and one like) required for the portable terminal 10 to set the wireless connection through the Bluetooth together with the relay device 20 is acquired and is set to the portable terminal 10 (Step S3).

Moreover, the first terminal side operating environment setting unit 2 transmits, to the relay device 20, the information (the information including the name and serial number of the portable terminal 10 and the like) required for the relay device 20 to set the wireless connection through the Bluetooth together with the portable terminal 10 (Step S4). In the relay device 20, the first operating environment setting information acquired from the portable terminal 10 is set to the relay device 20 as will be described below with reference to FIG. 4. Consequently, the pairing is performed between the portable terminal 10 and the relay device 20.

Thereafter, the peculiar information receiving unit 3 decides whether the identification information of the relay device 20 transmitted from the peculiar information transmitting unit 22 of the relay device 20 is received or not by utilizing the wireless connection through the Bluetooth set as described above (Step S5). If the identification information is not received, the decision of the Step S5 is repeated.

On the other hand, if the peculiar information receiving unit 3 receives the identification information of the relay device 20 transmitted from the relay device 20, the setting information generating unit 4 encrypts the received identification information of the relay device 20 to generate a password (Step S6). Next, the second terminal side operating environment setting unit 5 generates the registration ID of the portable terminal 10 to set the generated registration ID and password to the portable terminal 10 (Step S7).

Furthermore, the second terminal side operating environment setting unit 5 acquires the IP address of the portable terminal 10, and transmits the registration ID and the IP address of the portable terminal 10 and the password to the telephone call control server 400 and registers them therein (Step S8). Then, the setting information transmitting unit 6 transmits the second operating environment setting information (the password) generated by the setting information generating unit 4 to the relay device 20 by utilizing the wireless connection through the Bluetooth set in the Step S4 (Step S9). Consequently, the processing of the flowchart shown in FIG. 3 is ended.

In FIG. 4, in the relay device 20, the first relay side operating environment setting unit 21 first decides whether the information (the information including the name and serial number of the portable terminal 10 and the like transmitted in the Step S4) required for setting the wireless connection through the Bluetooth is received from the portable terminal 10 or not (Step S11). If the information is not received, the decision of the Step S11 is repeated.

On the other hand, if the information required for setting the wireless connection through the Bluetooth is received from the portable terminal 10 by the first relay side operating environment setting unit 21, the first relay side operating environment setting unit 21 sets the received information to the relay device 20, thereby performing the pairing through the Bluetooth between the portable terminal ID and the relay device 20 (Step S12).

Next, the peculiar information transmitting unit 22 transmits peculiar identification information to the relay device 20 to the portable terminal 10 by utilizing the wireless connection through the Bluetooth which is set (Step S13). Then, the setting information receiving unit 23 decides whether the second operating environment setting information (the password) transmitted by the setting information transmitting unit 6 of the portable terminal 10 is received or not (Step S14). If the second operating environment setting information is not received, the decision of the Step S14 is repeated.

On the other hand, if the setting information receiving unit 23 receives the second operating environment setting information, the second relay side operating environment setting unit 24 generates the registration ID of the relay device 20 and sets the generated registration ID and the password to the relay device 20 (Step S14). Furthermore, the second relay side operating environment setting unit 24 acquires the IP address of the relay device 20, and transmits the registration ID and the IP address of the relay device 20 and the password to the telephone call control server 400 and registers them therein (Step S15). Consequently, the processing of the flowchart shown in FIG. 4 is ended.

As described above in detail, according to the first embodiment, if the code 30 is read by the portable terminal 10 including a camera, the wireless connection through the Bluetooth is set automatically between the portable terminal 10 and the relay device 20 by reading the code 30. Furthermore, the SIP registration information required for the portable terminal 10 and the relay device 20 to be connected to the telephone call control server 400 by a wireless LAN to make a call is continuously set automatically by utilizing the wireless connection through the Bluetooth which is thus set automatically. Consequently, it is possible to automatically perform the setting required for utilizing the portable terminal 10 as a cordless extension Unit of a cordless telephone through the relay device 20 and the telephone call control server 400.

Second Embodiment

Next, a second embodiment according to the present invention will be described with reference to the drawings. In the second embodiment, an operating environment related to connection through a wireless LAN between second electronic equipment 20 and a wireless router 200 can also be set automatically in addition to setting of wireless connection through Bluetooth between a portable terminal 10 and a relay device 20 and setting of SIP registration information to a telephone call control server 400.

Figure 5:
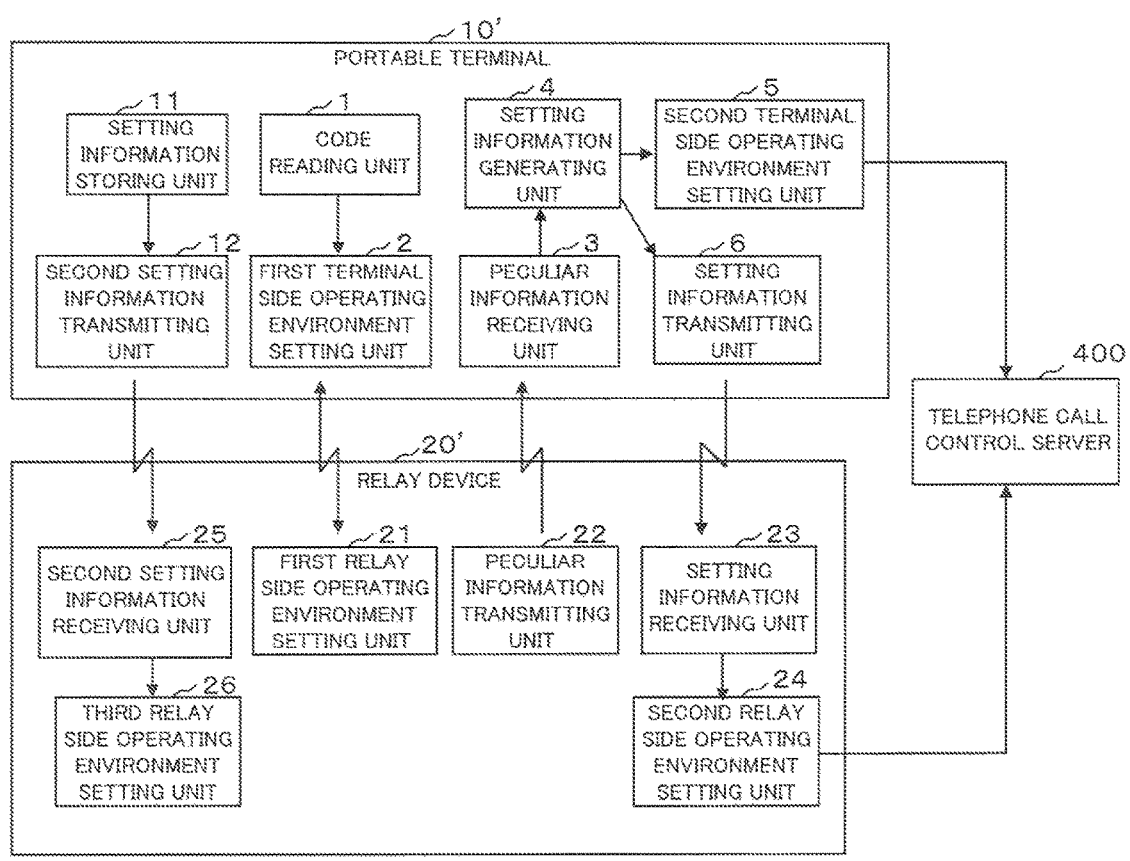
FIG. 5 is a block diagram showing an example of functional structures of a portable terminal and a relay device configuring an operating environment setting system according to a second embodiment.

FIG. 5 is a block diagram showing an example of functional structures of a portable terminal 10' and a relay device 20' provided in an operating environment setting system according to the second embodiment. In FIG. 5, components having the same reference numerals as those shown in FIG. 2 have the same functions and repetitive description will be therefore omitted.

As shown in FIG. 5, the portable terminal 10' according to the second embodiment further includes, as a functional structure thereof, a setting information storing unit 11 and a second setting information transmitting unit 12. Moreover, the relay device 20' further includes, as a functional structure thereof, a second setting information receiving unit 25 and a third relay side operating environment setting unit 26.

The setting information storing unit 11 of the portable terminal 10' stores third operating environment setting information required for performing wireless connection through a wireless LAN (for example, Wi-Fi). In the second embodiment, the third operating environment setting information implies necessary information for the relay device 20' to perform the wireless communication through the Wi-Fi via the wireless router 200. This is connection setting information including SSID to be transmitted from the wireless router 200 and a cipher mode and a password defined in the wireless router 200, and is information in which the portable terminal 10' has already been registered as a profile of the wireless router 200.

The second setting information transmitting unit 12 of the portable terminal 10' transmits third operating environment setting information stored in the setting information storing unit 11 to the relay device 20' by utilizing the wireless connection through the Bluetooth set by a first terminal side operating environment setting unit 2 and a first relay side operating environment setting unit 21.

When the portable terminal 10' is to set the wireless connection through the Wi-Fi together with the wireless router 200, it is predetermined that the third operating environment setting information (connection setting information) is stored in a specific storage region of a flash memory serving as the setting information storing unit 11. Accordingly, the second setting information transmitting unit 12 can acquire the third operating environment setting information by accessing the specific storage region of the setting information storing unit 11.

The second setting information receiving unit 25 of the relay device 20' receives the third operating environment setting information transmitted by the second setting information transmitting unit 12 with use of the wireless connection through the Bluetooth set by the first terminal side operating environment serving unit 2 and the first relay side operating environment setting unit 21.

The third relay side operating environment setting unit 26 of the relay device 20' acquires the third operating environment setting information received by the second setting information receiving unit 25 (information such as SSID, a cypher mode and a password required for the relay device 20' to perform wireless communication through Wi-Fi via the wireless router 200) and sets the third operating environment setting information to the relay device 20'. Consequently, the relay device 20' is brought into a state in which it can be connected by wireless to the same Wi-Fi network as the portable terminal 10' through the wireless router 200.

A second relay side operating environment setting unit 24 of the relay device 20' transmits second operating environment setting information received by a setting information receiving unit 23 to the telephone call control server 400 and registers the second operating environment setting information therein by utilizing wireless connection through a wireless LAN set based on the setting of the third operating environment setting information by the third relay side operating environment setting unit 26.

Figure 6:
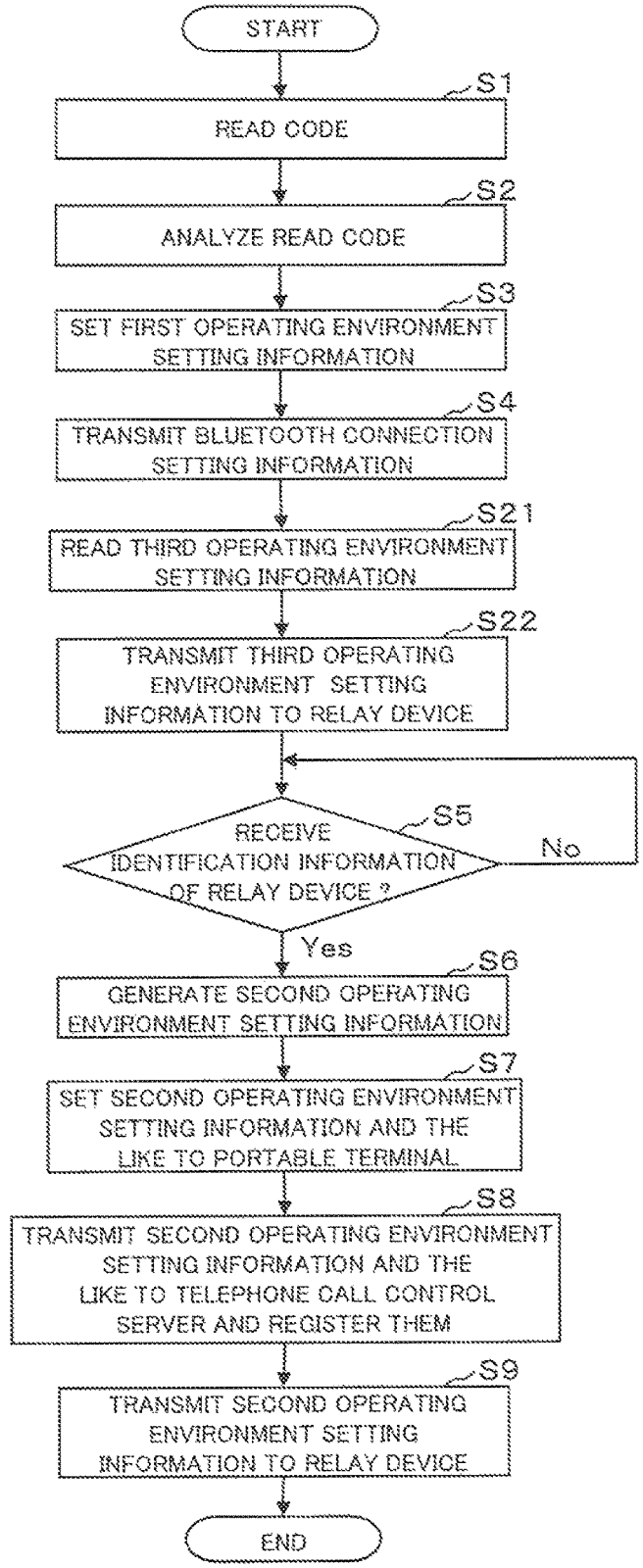
FIG. 6 is a flowchart showing an example of an operation of the portable terminal according to the second embodiment.
Figure 7:
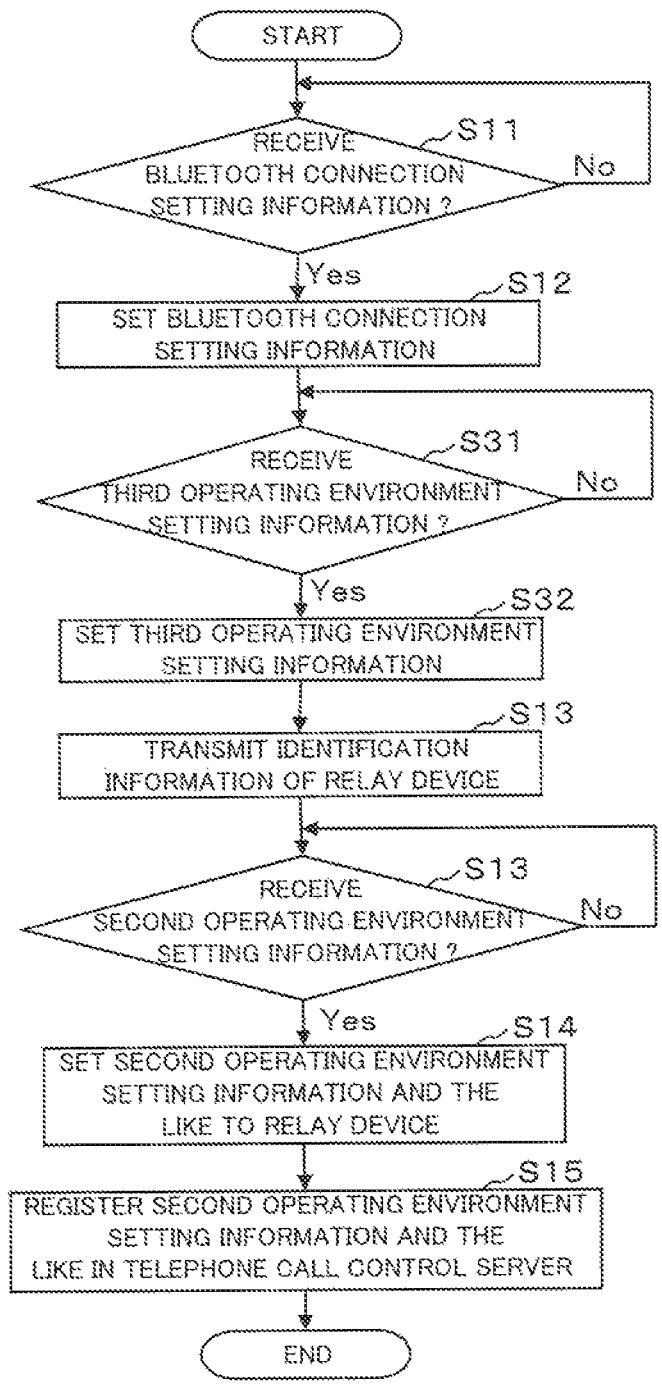
FIG. 7 is a flowchart showing an example of an operation of the relay device according to the second embodiment.
Figure 8:
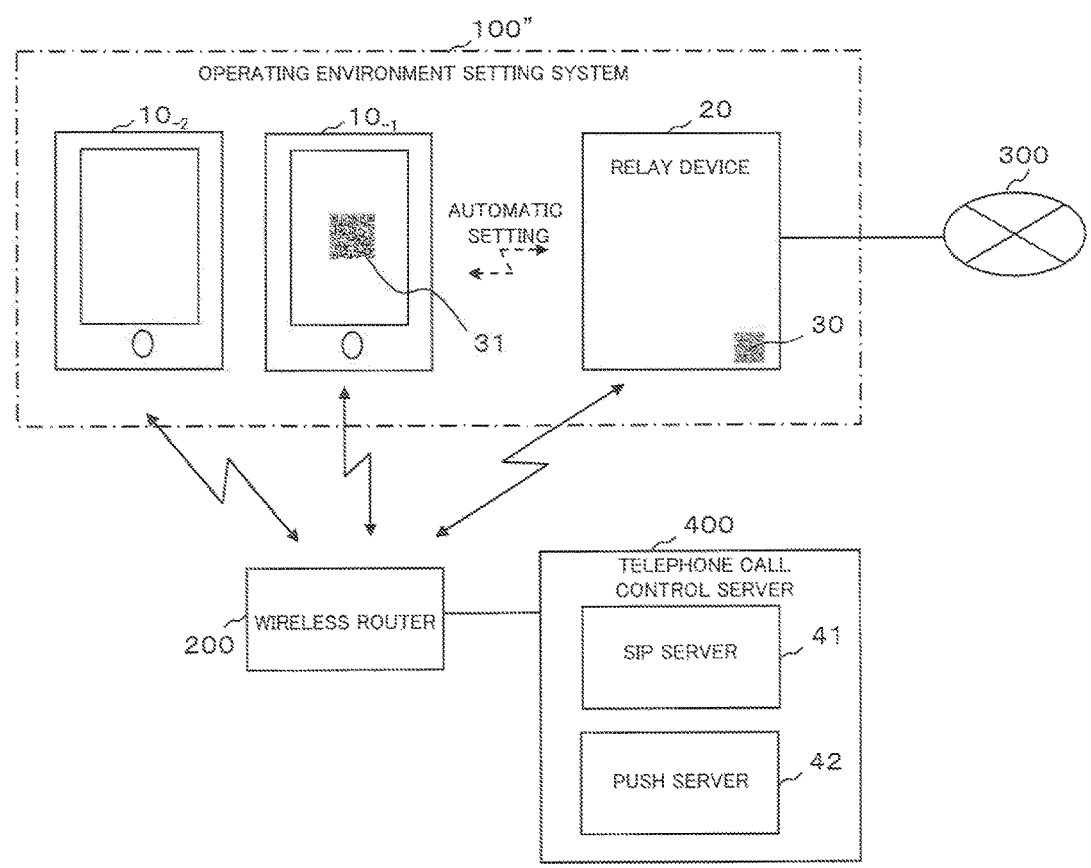
FIG. 8 is a diagram showing a schematic structure of a cordless telephone system including an operating environment setting system according to a third embodiment.

FIG. 6 is a flowchart showing an example of an operation of the portable terminal 10' according to the second embodiment having the structure described above. Moreover, FIG. 7 is a flowchart showing an example of an operation of the relay device 20' according to she second embodiment having the structure described above. Flowcharts shown in FIGS. 7 and 8 are started when power supplies of the portable terminal 10' and the relay device 20' are turned ON and the Bluetooth function of the portable terminal 10' is activated, for example.

In FIG. 6, portions having the same step numbers as the step numbers shown in FIG. 3 serve to execute the same processing and repetitive description will be therefore omitted. In FIG. 7, similarly, portions having the same step numbers as the step numbers shown in FIG. 4 serve to execute the same processing and repetitive description will be therefore omitted.

In FIG. 6, after the first terminal side operating environment setting unit 2 of the portable terminal 10' transmits the first operating environment setting information to the relay device 20' to perform pairing through Bluetooth in Step S4, the second setting information transmitting unit 12 reads the third operating environment setting information (the SSID, the cypher mode and the password of the wireless router 200 and the like) stored in the setting information storing unit 11 (Step S21). Thereafter, the third operating environment setting information thus read is transmitted to the relay device 20' by utilizing the wireless connection through the Bluetooth set in the Step S4 (Step S22). Subsequently, the processing proceeds to Step S5.

In FIG. 7, after the first relay side operating environment setting unit 21 sets the first operating environment setting information received from the portable terminal 10' to the relay device 20' to perform the pairing through the Bluetooth in Step S12, the second setting information receiving unit 25 decides whether the third operating environment setting information transmitted by the second setting information transmitting unit 12 of the portable terminal 10' is received or not (Step S31).

If the third operating environment setting information is not received, the decision of the Step S31 is repeated. On the other hand, if the second setting information receiving unit 25 receives the third operating environment setting information, the third relay side operating environment setting unit 26 acquires the third operating environment setting information thus received from the second setting information receiving unit 25 and sets the third operating environment setting information to the relay device 20' (Step S32). Then, the processing proceeds to Step S13.

As described above in detail, according to the second embodiment, if a code 30 is read by the portable terminal 10' including a camera, the wireless connection through the Bluetooth is set automatically between the portable terminal 10' and the relay device 20' by reading the code 30. Moreover, information required for setting to perform wireless LAN communication through Wi-Fi by the relay device 20' is transmitted from the portable terminal 10' to the relay device 20' by utilizing the wireless connection through the Bluetooth thus set automatically, and the wireless connection setting of the relay device 20' is performed automatically. Furthermore, SIP registration information required for connection of the portable terminal 10' and the relay device 20' to the telephone call control server 400 to make a call is automatically set by utilizing the wireless connection through the wireless LAN thus set automatically. Also in a state in which the connection through the wireless LAN is not set to the relay device 20', consequently, it is possible to automatically perform setting required for utilizing the portable terminal 10' as a cordless extension unit of a cordless telephone through the relay device 20' and the telephone call control server 400.

Third Embodiment

Next, a third embodiment according to the present invention will be described with reference to the drawings. In the third embodiment, a second portable terminal 10 can be further registered as a cordless extension unit of a cordless telephone.

FIG. 8 is a diagram showing a specific structure of a cordless telephone system including an operating environment setting system 100' according to the third embodiment. In FIG. 8, components having the same reference numerals as those shown in FIG. 1 have the same functions and repetitive description will be therefore omitted. Although the third embodiment will be described as a variant of the first embodiment, the third embodiment can also be applied as a variant of the second embodiment.

As shown in FIG. 8, the operating environment setting system 100" according to the third embodiment includes two portable terminals $10_{-1}$ and $10_{-2}$, and a relay device 20. The portable terminals $10_{-1}$ and $10_{-2}$ are smartphones or tablets, for example, and have a wireless communication function through Bluetooth and a wireless communication function through a wireless LAN such as Wi-Fi. Moreover, the portable terminals $10_{-1}$ and $10_{-2}$ include a camera and can read a code 30 stuck or printed on the relay device 20 or a second code 31 displayed on a screen of the portable terminal $10_{-1}$.

In the third embodiment, it is assumed that information required for performing wireless communication through a wireless LAN via the wireless router 200 has already been set to the portable terminals $10_{-1}$ and $10_{-2}$. In the third embodiment, it is assumed that the first portable terminal $10_{-1}$ is first registered as a first cordless extension unit of the cordless telephone and the second portable terminal $10_{-2}$ is then registered as a second cordless extension unit of the cordless telephone. An operation for registering the first portable terminal $10_{-1}$ as the first cordless extension unit is the same as that in the first embodiment or the second embodiment.

When the second portable terminal $10_{-2}$ is to be registered as a second cordless extension unit, the second code 31 displayed on the screen of the first portable terminal $10_{-1}$ is read in the second portable terminal $10_{-2}$ to start processing for registration. The second code 31 is a code recording second operating environment setting information generated by a setting information generating unit 4 when registering the first portable terminal $10_{-1}$ as the cordless extension unit and is issued by the first portable terminal $10_{-1}$.

Figure 9:
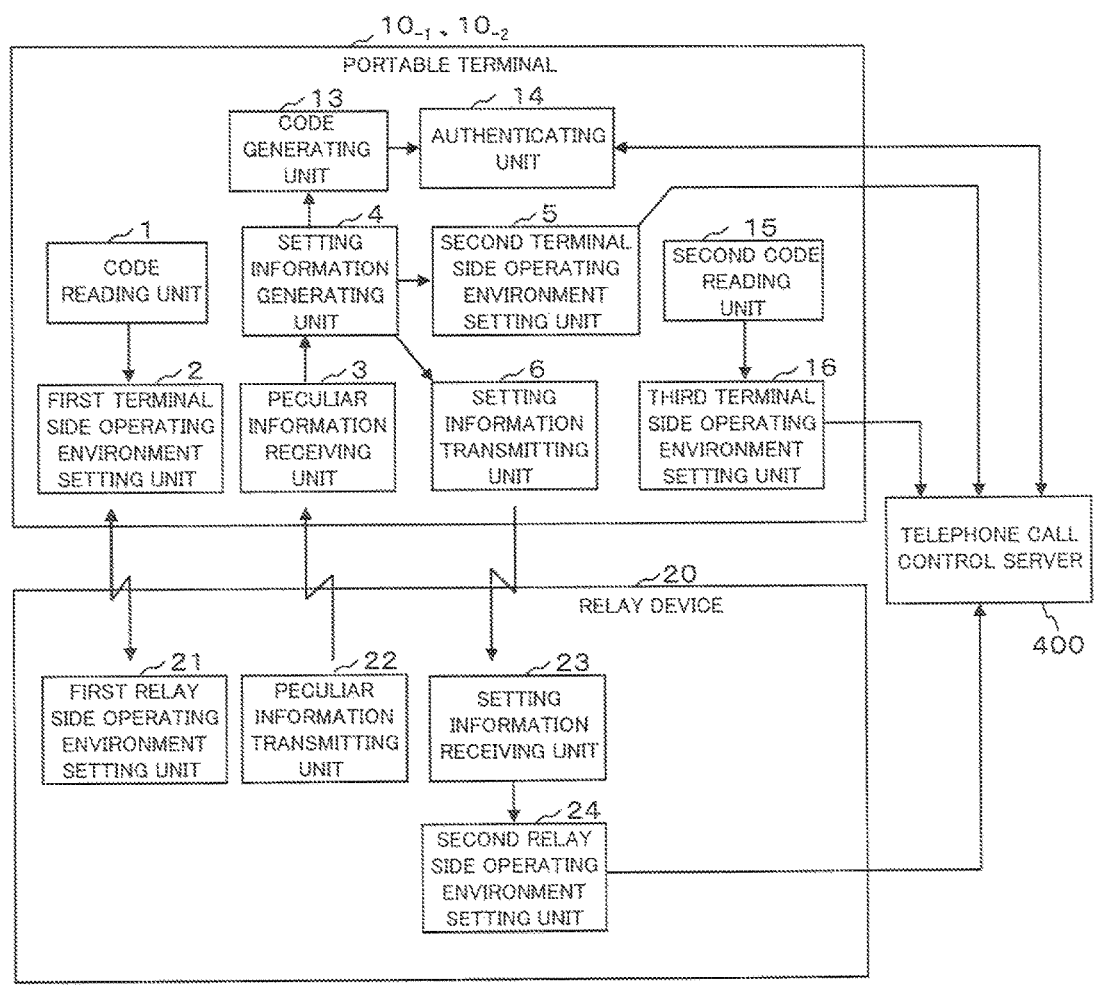
FIG. 9 is a block diagram showing an example of functional structures of a portable terminal and a relay device configuring the operating environment setting system according to the third embodiment.

FIG. 9 is a block diagram showing an example of functional structures of a portable terminal 10" and the relay device 20 provided in the operating environment setting system 100" according to the third embodiment. In FIG. 9, components having the same reference numerals as those shown in FIG. 2 have the same functions and repetitive description will be therefore omitted.

As shown in FIG. 9, the portable terminal 10" according to the third embodiment further includes, as a functional structure thereof, a code generating unit 13, an authenticating unit 14, a second code reading unit 15 and a third terminal side operating environment setting unit 16. The code generating unit 13 and the authenticating unit 14 are functions to be executed by the first portable terminal $10_{-1}$, and the second code reading unit 15 and the third terminal side operating environment setting unit 16 are functions to be executed by tee second portable terminal $10_{-2}$. A structure of the relay device 20 is the same as that in the first embodiment shown in FIG. 2.

The code generating unit 13 generates the second code 31 recording the second operating environment setting information generated by the setting information generating unit 4 (a password generated by encrypting identification information of the relay device 20 by the first portable terminal $10_{-1}$). The second code 31 to be generated herein is a code acting as image data which can be displayed on a display of the first portable terminal $10_{-1}$.

The second code reading unit 15 reads the second code 31 generated by the code generating unit 13 and displayed on the display of the first portable terminal $10_{-1}$ via a camera (not shown) provided in the second portable terminal $10_{-1}$.

The third terminal side operating environment setting unit 16 analyses the second code 31 read by the second code reading unit 15 and acquires the second operating environment setting information (the password). Moreover, the third terminal side operating environment setting unit 16 adds a registration ID of the second portable terminal $10_{-2}$ to the password and sets them to the second portable terminal $10_{-2}$, and transmits the registration ID and an IP address of the second portable terminal $10_{-2}$ and a password to a telephone call control server 400, thereby giving a registration request.

When the registration request is given from the second portable terminal $10_{-2}$ to the telephone call control server 400 as described above, the telephone call control server 400 gives an authentication request to the first portable terminal $10_{-1}$. The authentication request is given by transmitting a password sent from the second portable terminal $10_{-2}$ to the first portable terminal $10_{-1}$ and confirming validity of the password, for example.

The authenticating unit 14 performs authentication related to the validity of the password described above. Then, the telephone call control server 400 is notified of a result of the authentication. If the authentication is successful, the telephone call control server 400 formally registers the registration ID, the IP address and the password which are transmitted from the second portable terminal $10_{-2}$ and returns, to the second portable terminal $10_{-2}$, that the registration was performed. On the other hand, if the authentication is unsuccessful, the telephone call control server 400 returns, to the second portable terminal $10_{-2}$, that the registration was not performed.

As described above, in the third embodiment, the second code 31 generated by the code generating unit 13 provided in the first portable terminal $10_{-1}$ which has already set the second operating environment setting information is read by the second code reading unit 15 provided in the second portable terminal $10_{-2}$ which has not set the second operating environment setting information. Consequently, the second code 31 is analyzed by the third terminal side operating environment setting unit 16 provided in the second portable terminal $10_{-2}$ to set the second operating environment setting information to the second portable terminal $10_{-2}$, and furthermore, the second operating environment setting information is transmitted to the telephone call control server 400 and is thus registered therein. At this time, the registration ID and the IP address of the second portable terminal $10_{-2}$ are also registered together. By such an operation, it is possible to automatically perform setting required for utilizing the second portable terminal $10_{-2}$ as a cordless extension unit of a cordless telephone by simply reading the second code 31 through the second portable terminal $10_{-2}$ including a camera.

Although the description has been given by taking the smartphone or the tablet as an example of the portable terminals 10, 10', $10_{-1}$ and $10_{-2}$ in the first to third embodiments, the present invention is not restricted thereto. If the portable terminals 10, 10', $10_{-1}$ and $10_{-2}$ have a wireless communication function through Bluetooth, a wireless LAN communication function through Wi-Fi and a code reading function, electronic equipment other than the smartphone or the tablet may be used.

If the relay devices 20 and 20' described in the first to third embodiments have the wireless communication function through the Bluetooth and the wireless LAN communication function through the Wi-Fi, any electronic equipment can be used. For example, the relay devices 20 and 20' may be wearable equipment of a spectacle type, a watch type, a wristband type or the like.

Although the description has been given to the example in which the portable terminals 10, 10', $10_{-1}$ and $10_{-2}$ and the relay devices 20 and 20' are connected through the Bluetooth in the first to third embodiments, moreover, it is also possible to apply a wireless communication technology other than the Bluetooth (for example, ZigBee or the like).

Although the description has been given to the example in which the code 30 (an example of a medium) of the relay device 20 is read by the cameras of the portable terminals 10, 10', $10_{-1}$ and $10_{-2}$ to automatically perform the connection setting through the Bluetooth in the first to third embodiments, moreover, the present invention is not restricted thereto. For example, it is also possible to automatically perform the connection setting through the Bluetooth by reading a tag (another example of the medium) provided in the relay device 20 with use of NFC readers (corresponding to a reading unit in claims) of the portable terminals 10, 10', $10_{-1}$ and $10_{-2}$ utilizing short-distance wireless communicating means such as: NFC (Near Field Communication).

In addition, all of the first to third embodiments are only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 10, 10', $10_{-1}$, $10_{-2}$ portable terminal
1 code reading unit (reading unit)
2 first terminal side operating environment setting unit
3 peculiar information receiving unit
4 setting information generating unit
3 second terminal side operating environment setting unit
6 setting information transmitting unit
11 setting information storing unit
12 second setting information transmitting unit
13 code generating unit
14 authenticating unit
15 second code reading unit
16 third terminal side operating environment setting unit
20, 20' relay device
21 first relay side operating environment setting unit
22 peculiar information transmitting unit
23 setting information receiving unit
24 second relay side operating environment setting unit
25 second setting information receiving unit
26 third relay side operating environment setting unit
30 code (medium)
31 second code
41 SIP server
42 PUSH server
100, 100" operating environment setting system
200 wireless router
300 fixed telephone line
400 telephone call control server

The invention claimed is:

1. An operating environment setting system for setting an operating environment of a cordless telephone system in which a portable terminal having a telephone call application installed therein is connected to a fixed telephone line through a relay device and a telephone call control server, thereby enabling the portable terminal to be used as a cordless extension unit of a cordless telephone, wherein the portable terminal includes:
  a reading unit for reading a medium recording first operating environment setting information required for connecting the portable terminal and the relay device by wireless under a first wireless standard;
  a first terminal side operating environment setting unit for analyzing the medium read by the reading unit, and acquiring the first operating environment setting information required for setting wireless connection under the first wireless standard and setting the first operating environment setting information to the portable terminal;
  a setting information generating unit for generating second operating environment setting information required to connect the portable terminal and the relay device to the telephone call control server under a second wireless standard and to then make a call;
  a second terminal side operating environment setting unit for setting the second operating environment setting information generated by the setting information generating unit to the portable terminal, and transmitting the second operating environment setting information to the telephone call control server and registering the second operating environment setting information therein; and
  a setting information transmitting unit for transmitting the second operating environment setting information generated by the setting information generating unit to the relay device by utilizing the wireless connection set by the first terminal side operating environment setting unit, and the relay device includes:
  a first relay side operating environment setting unit for acquiring the first operating environment setting information from the portable terminal and setting the first operating environment setting information to the relay device when setting the wireless connection under the first wireless standard by the first terminal side operating environment setting unit of the portable terminal;
  a setting information receiving unit for receiving the second operating environment setting information transmitted by the setting information transmitting unit; and
  a second relay side operating environment setting unit for setting the second operating environment setting information received by the setting information receiving unit to the relay device, and transmitting the second operating environment setting information to the telephone call control server and registering the second operating environment setting information therein.

2. The operating environment setting system according to claim 1, wherein the portable terminal further includes:
a setting information storing unit for storing third operating environment setting information required for performing wireless connection under the second wireless standard; and
a second setting information transmitting unit for transmitting the third operating environment setting information stored in the setting information storing unit to the relay device by utilizing the wireless connection set by the first terminal side operating environment setting unit,
the relay device further includes:
a second setting information receiving unit for receiving the third operating environment setting information transmitted by the second setting information transmitting unit; and
a third relay side operating environment setting unit for setting the third operating environment setting information received by the second setting information receiving unit to the relay device, and
the second relay side operating environment setting unit of the relay device transmits the second operating environment setting information received by the setting information receiving unit to the telephone call control server and registers the second operating environment setting information therein by utilizing the wireless connection under the second wireless standard set based on the setting of the third operating environment setting information by the third relay side operating environment setting unit.

3. The operating environment setting system according to claim 2, wherein the third operating environment setting information is information required for setting to connect the relay device to a wireless LAN.

4. The operating environment setting system according to claim 2, wherein the reading unit reads a code or a tag as the medium recording the first operating environment setting information,
the portable terminal includes:
a code generating unit for generating a second code recording the second operating environment setting information generated by the setting information generating unit;
a second code reading unit for reading the second code generated by the code generating unit; and
a third terminal side operating environment setting unit for analyzing the second code read by the second code reading unit, acquiring the second operating environment setting information and setting the second operating environment setting information to the portable terminal, and transmitting the second operating environment setting information to the telephone call control server and registering the second operating environment setting information therein, and
the second code generated by the code generating unit provided in the portable terminal to which the second operating environment setting information has already been set is read by the second code reading unit provided in the portable terminal to which the second operating environment setting information has not been set yet so that the second code is analyzed to set the second operating environment setting information to the portable terminal and the second operating environment setting information is transmitted to the telephone call control server and is registered therein by the third terminal side operating environment setting unit provided in the portable terminal to which the second operating environment setting information has not been set yet.

5. The operating environment setting system according to claim 4, wherein the setting information generating unit of the portable terminal acquires peculiar identification information of the relay device from the relay device by utilizing the wireless connection set by the first terminal side operating environment setting unit, and encrypts the identification information to generate the second operating environment setting information.

6. The operating environment setting system according to claim 4, wherein the first operating environment setting information is information required for setting to perform wireless connection between the portable terminal and the relay device through Bluetooth.

7. The operating environment setting system according to claim 2, wherein the setting information generating unit of the portable terminal acquires peculiar identification information of the relay device from the relay device by utilizing the wireless connection set by the first terminal side operating environment setting unit, and encrypts the identification information to generate the second operating environment setting information.

8. The operating environment setting system according to claim 2, wherein the first operating environment setting information is information required for setting to perform wireless connection between the portable terminal and the relay device through Bluetooth.

9. The operating environment setting system according to claim 1, wherein the reading unit reads a code or a tag as the medium recording the first operating environment setting information,
the portable terminal includes:
a code generating unit for generating a second code recording the second operating environment setting information generated by the setting information generating unit;
a second code reading unit for reading the second code generated by the code generating unit; and
a third terminal side operating environment setting unit for analyzing the second code read by the second code reading unit, acquiring the second operating environment setting information and setting the second operating environment setting information to the portable terminal, and transmitting the second operating environment setting information to the telephone call control server and registering the second operating environment setting information therein, and
the second code generated by the code generating unit provided in the portable terminal to which the second operating environment setting information has already been set is read by the second code reading unit provided in the portable terminal to which the second operating environment setting information has not been set yet so that the second code is analyzed to set the second operating environment setting information to the portable terminal and the second operating environment setting information is transmitted to the telephone call control server and is registered therein by the third terminal side operating environment setting unit provided in the portable terminal to which the second operating environment setting information has not been set yet.

10. The operating environment setting system according to claim 9, wherein the setting information generating unit of the portable terminal acquires peculiar identification information of the relay device from the relay device by utilizing the wireless connection set by the first terminal side operating environment setting unit, and encrypts the identification information to generate the second operating environment setting information.

11. The operating environment setting system according to claim 9, wherein the first operating environment setting information is information required for setting to perform wireless connection between the portable terminal and the relay device through Bluetooth.

12. The operating environment setting system according to claim 1, wherein the setting information generating unit of the portable terminal acquires peculiar identification information of the relay device from the relay device by utilizing the wireless connection set by the first terminal side operating environment setting unit, and encrypts the identification information to generate the second operating environment setting information.

13. The operating environment setting system according to claim 1, wherein the first operating environment setting information is information required for setting to perform wireless connection between the portable terminal and the relay device through Bluetooth.

14. A computer readable operating environment setting program mounted on a portable terminal having a telephone call application installed therein in a cordless telephone system having a relay device and the portable terminal and capable of using the portable terminal as a cordless extension unit of a cordless telephone by connection of the portable terminal to a fixed telephone line through the relay device and a telephone call control server, the operating environment setting program for causing a computer of the portable terminal to function as:
  reading means for reading a medium recording first operating environment setting information required for connecting the portable terminal and the relay device by wireless under a first wireless standard;
  first terminal side operating environment setting means for analyzing the medium read by the reading means, and acquiring the first operating environment setting information required for setting wireless connection under the first wireless standard and setting the first operating environment setting information to the portable terminal;
  setting information generating means for generating second operating environment setting information required to connect the portable terminal and the relay device to the telephone call control server under a second wireless standard and to then make a call;
  second terminal side operating environment setting means for setting the second operating environment setting information generated by the setting information generating means to the portable terminal, and transmitting the second operating environment setting information to the telephone call control server and registering the second operating environment setting information therein; and
  setting information transmitting means for transmitting the second operating environment setting information generated by the setting information generating means to the relay device by utilizing the wireless connection set by the first terminal side operating environment setting means.

15. A computer readable operating environment setting program mounted on a relay device and operated in cooperation with the program according to claim 7 mounted on a portable terminal having a telephone call application installed therein in a cordless telephone system having the relay device and the portable terminal and capable of using the portable terminal as a cordless extension unit of a cordless telephone by connection of the portable terminal to a fixed telephone line through the relay device and a telephone call control server, the operating environment setting program for causing a computer of the relay device to function as:
  first relay side operating environment setting means for acquiring the first operating environment setting information from the portable terminal and setting the first operating environment setting information to the relay device when setting the wireless connection under the first wireless standard by the first terminal side operating environment setting means of the portable terminal;
  setting information receiving means for receiving the second operating environment setting information transmitted by the setting information transmitting means; and
  second relay side operating environment setting means for setting the second operating environment setting information received by the setting information receiving means to the relay device, and transmitting the second operating environment setting information to the telephone call control server and registering the second operating environment setting information therein.

16. A portable terminal having a telephone call application installed therein which is used in a cordless telephone system capable of utilizing the portable terminal as a cordless extension unit of a cordless telephone by connection of the portable terminal to a fixed telephone line through a relay device and a telephone call control server, comprising:
  a reading unit for reading a medium recording first operating environment setting information required for connecting the portable terminal and the relay device by wireless under a first wireless standard;
  a first terminal side operating environment setting unit for analyzing the medium read by the reading unit, and acquiring the first operating environment setting information required for setting wireless connection under the first wireless standard and setting the first operating environment setting information to the portable terminal;
  a setting information generating unit for generating second operating environment setting information required to connect the portable terminal and the relay device to the telephone call control server under a second wireless standard and to then make a call;
  a second terminal side operating environment setting unit for setting the second operating environment setting information generated by the setting information generating unit to the portable terminal, and transmitting the second operating environment setting information to the telephone call control server and registering the second operating environment setting information therein; and
  a setting information transmitting unit for transmitting the second operating environment setting information generated by the setting information generating unit to the relay device by utilizing the wireless connection set by the first terminal side operating environment setting unit.

17. A relay device used in a cordless telephone system capable of utilizing a portable terminal having a telephone call application installed therein as a cordless extension unit of a cordless telephone by connection of the portable terminal to a fixed telephone line through the relay device and a telephone call control server and operated in cooperation with the portable terminal according to claim 16, comprising a first relay side operating environment setting unit for acquiring the first operating environment setting information from the portable terminal and setting the first operating environment setting information to the relay device when setting the wireless connection under the first wireless standard by the first terminal side operating environment setting unit of the portable terminal;

a setting information receiving unit for receiving the second operating environment setting information transmitted by the setting information transmitting unit; and a second relay side operating environment setting unit for setting the second operating environment setting information received by the setting information receiving unit to the relay device, and transmitting the second operating environment setting information to the telephone call control server and registering the second operating environment setting information therein.

\* \* \* \* \*